D. BRIDGES.
Dredging and Ditching Machine.
No. 210,448. Patented Dec. 3, 1878.
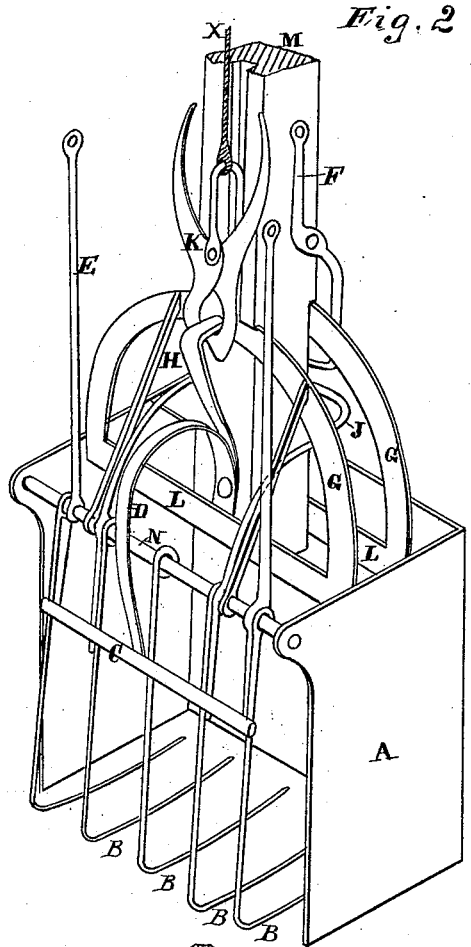
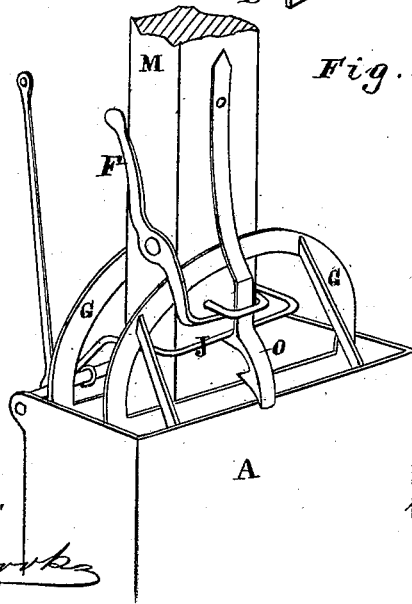
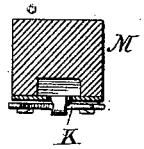
Witnesses
Geo. H. Strong.
Inventor
Daniel Bridges
by Dewey & Co.
Atty

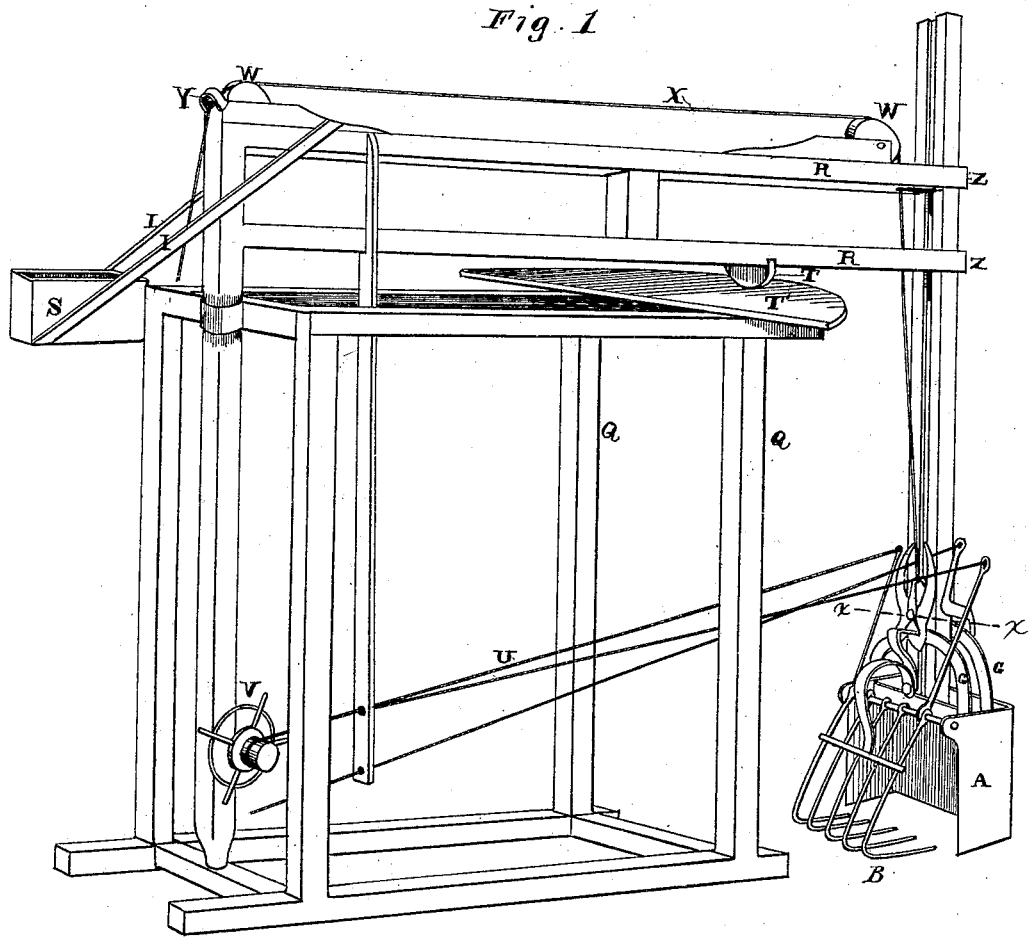

UNITED STATES PATENT OFFICE.

DANIEL BRIDGES, OF COQUILLE, OREGON.

IMPROVEMENT IN DREDGING AND DITCHING MACHINES.

Specification forming part of Letters Patent No. 210,448, dated December 3, 1878; application filed September 2, 1878.

*To all whom it may concern:*

Be it known that I, DANIEL BRIDGES, of Coquille city, county of Coos, and State of Oregon, have invented an Improved Dredging and Ditching Machine; and I do hereby declare the following to be a full, clear, and exact description of the same, reference being had to the accompanying drawings.

My invention relates to an improved dredging and ditching machine; and these improvements consist in a novel combination of mechanism by which I am enabled to cut out and lift the earth by the vertical action of the dredging-bucket, and in certain details of construction, which will be more fully described by reference to the accompanying drawings, in which—

Figure 1 is a perspective view. Fig. 2 is an enlarged view of the bucket and operating parts, and Fig. 3 is a view showing the operation of the releasing catch and lever. Fig. 4 is a cross-section on line $x\,x$ of Fig. 1.

Let A represent a rectangularly-shaped shovel or cutter, which is open at the top, bottom, and front, and which is constructed of boiler-iron, the lower or cutting edge being made of steel. The handle or arm M is made of wood, and is bolted to the iron frame carrying the shovel or bucket. This frame consists of two semicircular flat bars, G G, and straight bars L L, which are welded or bolted together and riveted to the shovel or bucket A.

A rod, N, extends across between the upper ends of the side plates of the shovel A, on which are secured a series of grapples, B B, which have their lower ends turned at right angles, so as to extend across the open bottom of the shovel, as shown. A cross-bar, C, extends across the grapples, so as to secure them together, in order that they will operate simultaneously.

Attached to the rod N is a bail, J, which passes around the shovel-handle M, and which is intended to hold the grapple in a closed position by means of the spring-catch O, as shown in Fig. 3. The bail J is released from the spring-catch O by means of the lever F, the handle of which extends upward, as shown. A spring, D, is bolted to the handle, which serves to throw the grapple open when the bail is released.

A groove is cut lengthwise in the handle or arm M, in which runs a flat sliding guide carrying the gripe or nippers K. The chain X, attached to the nippers K by a clevis, passes over the pulleys W W, and between the guide-pulleys Y Y to the engine or other power.

The handle M passes up through the iron guide-straps Z Z, which may be fitted with friction-rollers, and which are attached to the arms of the double-arm crane R, supported by the frame-work Q. This frame-work may be placed on a scow for dredging or reclamation purposes, or on a car or wagon, according to the class of work to be performed by the machine.

The traveler T runs on an iron track or in the frame-work, this track being laid on a suitable platform, T', projecting over each side of the frame-work, to allow of the necessary swing for dumping on an embankment or into a scow.

Attached to the two tail-poles I is the weight-box S, which serves as a counterpoise to balance the crane, and also as a handle for swinging the bucket or shovel in either direction around the center. H is a catch, with which the nippers engage to lift the shovel and handle, and also answers as a bolt to fasten the handle M in the iron arch G G.

The operation of the device is as follows: When the engine is started up, the chain X draws the bucket and beam up, by means of the nippers K, until the upper ends of the gripe pass into the lower guide-strap and are compressed, thereby releasing the bucket and beam. As the bucket falls its sharp edges are forced into the earth or mud until it is filled. The spring D holds the grapples open during this operation; but after the bucket falls, the wheel V is turned and winds the rope U on a barrel, thus closing the grapples across the lower end of the buckets by said rope U pulling on the upper ends of the levers E, to which it is secured, as shown. The chain X is then slackened, and the nippers slide down the handle on its guide in the groove until it meets the catch H, which it gripes automatically. On power hereby applied, the shovel is raised up to the proper height, carrying the load with it. The crane is then turned until the shovel is in the proper position to be dumped. By moving the lever F the catch releases the bail, and the spring D throws the grapples back, so that the load is dumped, when the crane is then swung back for another cut.

This machine can be made on a small scale, to be worked by hand for ditching purpose, or may be made large, to be worked by steam-power for reclamation purposes. It will operate in any earth stiff enough to hold together without falling between the forks of the grapple. For softer material, I can place a piece of metal across the forks, so as to make the bottom close when closed.

The device is more particularly intended to construct dikes or ditches on marsh, swamp, tule, or tide lands, where there is little or no fall in the ground, and where the marshy character of the soil is such as to preclude the use of horse-power. The device is used to the best advantage on a scow, being operated by hand or steam power.

Having thus described my invention, what I claim as new, and desire to secure by Letters Patent, is—

1. The rectangular open cutter and bucket A, with its vertically-moving operating-stem M, in combination with the movable grappling hooks or plate B B, fitted to pass beneath the load and hold it in place until raised, substantially as herein described.

2. The cutting and containing bucket A, having the grappling-hooks B swinging upon the axle or bar N, said hooks being provided with the bail J, catch O, and releasing-lever F, and the actuating or opening spring D, substantially as herein described.

3. The bucket A, with its stem M, moving vertically in the guides Z Z, in combination with the lifting-chains X X, tongs or nippers K, and catch H, substantially as and for the purpose herein described.

4. The bucket A, with its stem M, moving vertically, as shown, and the lifting-chain and nippers, in combination with the grappling-hooks B, swinging upon the shaft N, the arms E, chain U, and operating-drum V, whereby the hooks are entered beneath the bucket, substantially as herein described.

5. The vertically-moving bucket A, with its guiding-stem M and lifting-chain X, in combination with the frame Q, having the platform T', and the double-armed crane R, with its traveler T, and the counterpoise-arms I, substantially as and for the purpose herein described.

In witness whereof I hereunto set my hand and seal.

DANIEL BRIDGES. [L. S.]

Witnesses:
 ALLEN COLLIER,
 CURTIS ANDREWS.